United States Patent
Miyamoto et al.

(10) Patent No.: US 11,555,457 B2
(45) Date of Patent: Jan. 17, 2023

(54) FUEL CONTROL DEVICE, COMBUSTOR, GAS TURBINE, FUEL CONTROL METHOD, AND PROGRAM

(71) Applicant: Mitsubishi Hitachi Power Systems, Ltd., Kanagawa (JP)

(72) Inventors: Kenji Miyamoto, Tokyo (JP); Kotaro Miyauchi, Yokohama (JP); Hisashi Nakahara, Yokohama (JP); Kiyoshi Fujimoto, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 556 days.

(21) Appl. No.: 16/082,088

(22) PCT Filed: Mar. 8, 2017

(86) PCT No.: PCT/JP2017/009217
§ 371 (c)(1),
(2) Date: Sep. 4, 2018

(87) PCT Pub. No.: WO2017/154976
PCT Pub. Date: Sep. 14, 2017

(65) Prior Publication Data
US 2020/0291872 A1    Sep. 17, 2020

(30) Foreign Application Priority Data
Mar. 8, 2016  (JP) .............................. JP2016-044242

(51) Int. Cl.
*F02C 9/32*    (2006.01)
*F02C 9/28*    (2006.01)
(Continued)

(52) U.S. Cl.
CPC ................ *F02C 9/28* (2013.01); *F02C 7/232* (2013.01); *F02C 9/32* (2013.01); *F05D 2260/96* (2013.01);
(Continued)

(58) Field of Classification Search
CPC ......................... F02C 9/34; F23R 2900/00013
See application file for complete search history.

(56) References Cited

U.S. PATENT DOCUMENTS 3,020,717 A * 2/1962 Pearce, Jr. ................ F23R 3/28
                                                  60/39.281
3,878,676 A * 4/1975 Hitzelberger ............ F02C 9/36
                                                  60/39.281
(Continued)

FOREIGN PATENT DOCUMENTS

| EP | 2 508 734 | 10/2012 |
| JP | 5-149544  | 6/1993  |

(Continued)

OTHER PUBLICATIONS

International Search Report dated May 16, 2017 in International (PCT) Application No. PCT/JP2017/009217.
(Continued)

*Primary Examiner* — Todd E Manahan
*Assistant Examiner* — Marc J Amar
(74) *Attorney, Agent, or Firm* — Wenderoth, Lind & Ponack, L.L.P.

(57) ABSTRACT

A fuel control device includes a stem fuel valve opening degree determination unit, a branch line flow rate determination unit, and a correction value determination unit. The stem fuel valve opening degree determination unit is configured to determine an opening degree of a flow rate adjustment valve of a stem fuel supply line. The branch line flow rate determination unit is configured to determine an
(Continued)

opening degree of a flow rate adjustment valve of at least one branch line. The correction value determination unit is configured to determine a correction value of the opening degree of the flow rate adjustment valve of the at least one branch line based on a value of a pressure difference between a fuel pressure upstream of a nozzle connected to the at least one branch line and a corrected fuel pressure for a fuel pressure at an outlet.

8 Claims, 4 Drawing Sheets

(51) Int. Cl.
  *F02C 7/232* (2006.01)
  *F23R 3/28* (2006.01)
(52) U.S. Cl.
  CPC .. *F05D 2270/14* (2013.01); *F05D 2270/3015* (2013.01); *F23R 3/28* (2013.01)

(56) References Cited

U.S. PATENT DOCUMENTS

| | | | | |
|---|---|---|---|---|
| 4,918,925 A * | 4/1990 | Tingle | F02C 7/228 | 60/739 |
| 6,092,362 A * | 7/2000 | Nagafuchi | F02C 9/34 | 60/39.281 |
| 6,148,601 A * | 11/2000 | Jones | F02C 9/28 | 60/773 |
| 6,385,975 B1 * | 5/2002 | Nakamoto | F01D 25/002 | 60/39.281 |
| 6,880,325 B2 * | 4/2005 | Aoyama | F23R 3/28 | 60/39.37 |
| 7,441,398 B2 * | 10/2008 | Ziminsky | F02C 7/222 | 60/39.281 |
| 7,549,293 B2 * | 6/2009 | Gallagher | F02C 9/24 | 60/39.281 |
| 8,915,059 B2 * | 12/2014 | Rentala | F02C 9/34 | 60/734 |
| 9,677,686 B2 * | 6/2017 | Solacolu | F23N 1/022 | 60/772 |
| 2003/0144787 A1 * | 7/2003 | Davis, Jr. | F02C 7/228 | 701/100 |
| 2004/0011051 A1 * | 1/2004 | Ryan | F02C 9/28 | 60/773 |
| 2005/0268617 A1 * | 12/2005 | Amond, III | F23R 3/343 | 60/776 |
| 2006/0218933 A1 * | 10/2006 | Schuermans | F23N 1/002 | 60/776 |
| 2007/0089395 A1 * | 4/2007 | Fujii | F02C 9/28 | 60/39.281 |
| 2007/0163267 A1 * | 7/2007 | Flohr | F23R 3/34 | 60/786 |
| 2008/0016875 A1 * | 1/2008 | Ryan | F23R 3/46 | 60/776 |
| 2009/0077945 A1 * | 3/2009 | Cornwell | F23R 3/28 | 60/39.281 |
| 2009/0145131 A1 * | 6/2009 | Kreutle | F02C 9/34 | 60/734 |
| 2009/0223226 A1 * | 9/2009 | Koizumi | F02C 7/222 | 60/736 |
| 2010/0168980 A1 * | 7/2010 | Fuller | F23R 3/343 | 60/776 |
| 2010/0174466 A1 * | 7/2010 | Davis, Jr. | F02C 9/28 | 60/773 |
| 2012/0073301 A1 * | 3/2012 | Paradise | F02C 9/34 | 60/746 |
| 2013/0014514 A1 * | 1/2013 | Romig | F02C 7/224 | 60/776 |
| 2013/0318993 A1 * | 12/2013 | Erickson | F23R 3/34 | 60/786 |
| 2013/0327050 A1 * | 12/2013 | Slobodyanskiy | F23N 1/022 | 60/772 |
| 2014/0000276 A1 * | 1/2014 | Royer | F02C 9/34 | 60/776 |
| 2016/0195024 A1 * | 7/2016 | Hoke | F02C 9/34 | 701/100 |
| 2016/0258629 A1 * | 9/2016 | Slobodyanskiy | F23R 3/286 | |
| 2017/0009666 A1 * | 1/2017 | Cano Wolff | F02C 7/224 | 60/776 |
| 2021/0180519 A1 * | 6/2021 | Williams | F02C 3/08 | |

FOREIGN PATENT DOCUMENTS

| | | | | |
|---|---|---|---|---|
| JP | 06323165 A | * | 11/1994 | F23R 3/26 |
| JP | 11-117769 | | 4/1999 | |
| JP | 11-343869 | | 12/1999 | |
| JP | 11343869 A | * | 12/1999 | |
| JP | 2002-364385 | | 12/2002 | |
| JP | 2007-77866 | | 3/2007 | |
| JP | 2010-156328 | | 7/2010 | |
| JP | 2011-241782 | | 12/2011 | |
| JP | 2016-23594 | | 2/2016 | |
| JP | 2016023594 A | * | 2/2016 | F23R 3/26 |

OTHER PUBLICATIONS

Written opinion of the International Searching Authority dated May 16, 2017 in International (PCT) Application No. PCT/JP2017/009217, with English translation.

* cited by examiner

FUEL CONTROL DEVICE, COMBUSTOR, GAS TURBINE, FUEL CONTROL METHOD, AND PROGRAM

CROSS-REFERENCE TO RELATED APPLICATION

Priority is claimed from Japanese Patent Application No. 2016-044242, filed Mar. 8, 2016, the content of which is incorporated herein by reference.

TECHNICAL FIELD

The present invention relates to a fuel control device, a combustor, a gas turbine, a fuel control method, and a program.

BACKGROUND ART

There is a gas turbine including a combustor having a plurality of nozzles. As a related technique, Japanese Unexamined Patent Application, First Publication No. 2007-77866 discloses a technique that includes a combustor having a plurality of nozzles and which controls a fuel flow rate on the basis of an operation state of a gas turbine.

SUMMARY OF INVENTION

Technical Problem

Incidentally, there may be a problem that when pressure differences between a fuel pressure upstream of each of the nozzles of a combustor and a corrected fuel pressure for the fuel pressure at an outlet varies, the combustion characteristics of the gas turbine vary.

Therefore, an object of the present invention is to provide a fuel control device, a combustor, a gas turbine, a fuel control method, and a program capable of solving the above problem.

Solution to Problem

According to a first aspect of the present invention, a fuel control device includes a stem fuel valve opening degree determination unit configured to determine an opening degree of a flow rate adjustment valve of a stem fuel supply line serving as the basis of a plurality of branch lines on the basis of a fuel control signal command value according to an output of a gas turbine, a branch line flow rate determination unit configured to determine the opening degree of each flow rate adjustment valve of the branch line on the basis of an operation situation of the gas turbine, and a correction value determination unit configured to determine a correction value of the opening degree of each flow rate adjustment valve of the branch line on the basis of a value of a pressure difference between a fuel pressure upstream of each of nozzles connected to the branch lines respectively and a corrected fuel pressure for the fuel pressure at an outlet.

According to a second aspect of the present invention, in the fuel control device of the first aspect, in a case where the pressure difference between the fuel pressure upstream of a second fuel nozzle connected to the branch line and the corrected fuel pressure for the fuel pressure at the outlet is reduced, the correction value determination unit may determine a correction value for increasing a third fuel control signal command value.

According to a third aspect of the present invention, in the fuel control device of the first aspect or the second aspect, in a case where the pressure difference between the fuel pressure upstream of the second fuel nozzle connected to the branch line and the corrected fuel pressure for the fuel pressure at the outlet is in a range of 0.1 megapascals to 1 megapascal, the correction value determination unit may determine the correction value of the opening degree of each flow rate adjustment valve of the branch line.

According to a fourth aspect of the present invention, in the fuel control device of any one of the first to third aspects, in a case where the pressure difference between the fuel pressure upstream of a first fuel nozzle connected to the branch line and the corrected fuel pressure for the fuel pressure at the outlet is reduced, the correction value determination unit may determine the correction value for increasing a first fuel control signal command value.

According to a fifth aspect of the present invention, in the fuel control device of any one of the first to fourth aspects, in a case where the pressure difference between the fuel pressure upstream of the first fuel nozzle connected to the branch line and the corrected fuel pressure for the fuel pressure at the outlet is in a range of 0.01 megapascals to 0.1 megapascals, the correction value determination unit may determine the correction value of the opening degree of each flow rate adjustment valve of the branch line.

According to a sixth aspect of the present invention, a combustor includes a first fuel nozzle of which a flow rate is controlled by a first flow rate adjustment valve included in the fuel control device of any one of the first to fifth aspects, a second fuel nozzle of which a flow rate is controlled by a second flow rate adjustment valve included in the fuel control device, and a third fuel nozzle of which a flow rate is controlled by a third flow rate adjustment valve included in the fuel control device.

According to a seventh aspect of the present invention, a gas turbine includes the fuel control device of any one of the first to fifth aspects, and a combustor including a first fuel nozzle of which a flow rate is controlled by a first flow rate adjustment valve included in the fuel control device, a second fuel nozzle of which a flow rate is controlled by a second flow rate adjustment valve included in the fuel control device, and a third fuel nozzle of which a flow rate is controlled by a third flow rate adjustment valve included in the fuel control device.

According to an eighth aspect of the present invention, a fuel control method includes determining an opening degree of a flow rate adjustment valve of a stem fuel supply line serving as the basis of a plurality of branch lines on the basis of a fuel control signal command value according to an output of a gas turbine, determining the opening degree of each flow rate adjustment valve of the branch line on the basis of an operation situation of the gas turbine, and determining a correction value of the opening degree of each flow rate adjustment valve of the branch line on the basis of a value of a pressure difference between a fuel pressure upstream of each of nozzles connected to the branch lines respectively and a corrected fuel pressure for the fuel pressure at an outlet.

According to a ninth aspect of the present invention, a program causes a computer to execute determining an opening degree of a flow rate adjustment valve of a stem fuel supply line serving as the basis of a plurality of branch lines on the basis of a fuel control signal command value according to an output of a gas turbine, determining the opening degree of each flow rate adjustment valve of the branch line on the basis of an operation situation of the gas turbine, and determining a correction value of the opening degree of each flow rate adjustment valve of the branch line on the basis of a value of a pressure difference between a fuel pressure upstream of each of nozzles connected to the branch lines respectively and a corrected fuel pressure for the fuel pressure at an outlet.

Advantageous Effects of Invention

According to the fuel control device according to the embodiment of the present invention, it is possible to prevent variation in combustion characteristics of a gas turbine occurring in a case where a pressure difference between a fuel pressure upstream of each of the nozzles of a combustor and a corrected fuel pressure for the fuel pressure at an outlet varies.

DESCRIPTION OF EMBODIMENTS

Hereinafter, an embodiment will be described in detail with reference to the drawings. A constitution of a gas turbine 1 according to an embodiment of the present invention will be described.

Figure 1:
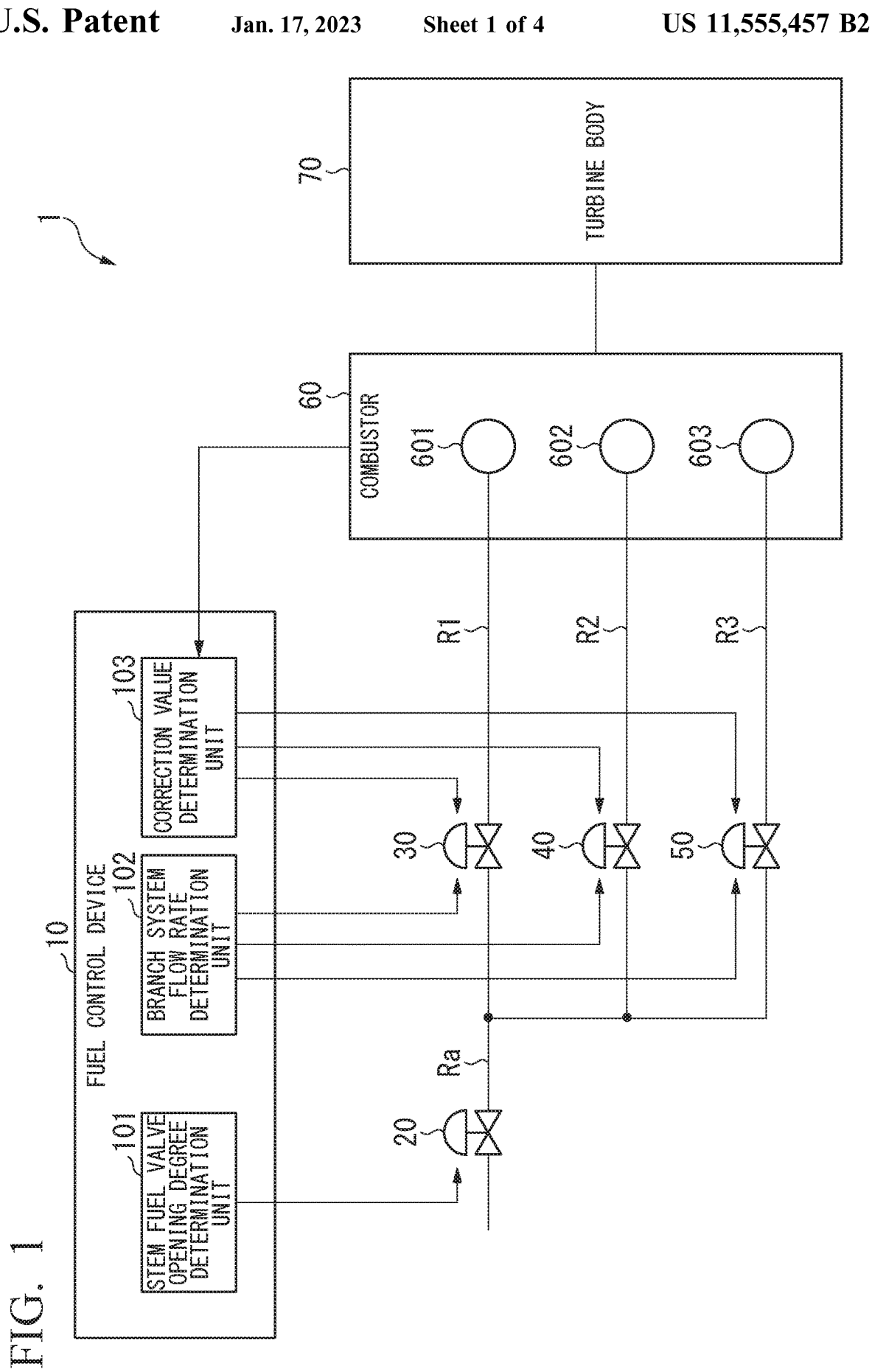
FIG. 1 is a diagram showing a constitution of a gas turbine according to an embodiment of the present invention.

As shown in FIG. 1, the gas turbine 1 according to an embodiment of the present invention includes a fuel control device 10, a first flow rate adjustment valve 20, a second flow rate adjustment valve 30, a third flow rate adjustment valve 40, a fourth flow rate adjustment valve 50, a combustor 60, and a turbine body 70.

In addition, in FIG. 1, a stem fuel supply line is denoted by a reference sign Ra. In addition, in FIG. 1, a first branch line that is one of a plurality of branch lines branching from the stem fuel supply line Ra is denoted by a reference sign R1. In addition, in FIG. 1, a second branch line branching from the stem fuel supply line Ra is denoted by a reference sign R2, and a third branch line branching from the stem fuel supply line Ra is denoted by a reference sign R3.

The fuel control device 10 includes a stem fuel valve opening degree determination unit 101, a branch line flow rate determination unit 102, and a correction value determination unit 103.

The stem fuel valve opening degree determination unit 101 determines an opening degree of a flow rate adjustment valve (the first flow rate adjustment valve 20) of the stem fuel supply line Ra serving as the basis of a plurality of branch lines (the first branch line R1, the second branch line R2, and the third branch line R3) on the basis of a fuel control signal command value according to an output of the gas turbine 1. For example, the fuel control signal command value according to the output of the gas turbine 1 is defined as a value proportional to an output of an electric generator (not shown) driven by the gas turbine 1 or a value proportional to a gas turbine inlet fuel gas temperature.

The branch line flow rate determination unit 102 determines the opening degrees of each of the flow rate adjustment valves (the second flow rate adjustment valve 30, the third flow rate adjustment valve 40, and the fourth flow rate adjustment valve 50) of the plurality of branch lines branching from the stem fuel supply line Ra on the basis of an operation situation of the gas turbine 1.

Figure 4:
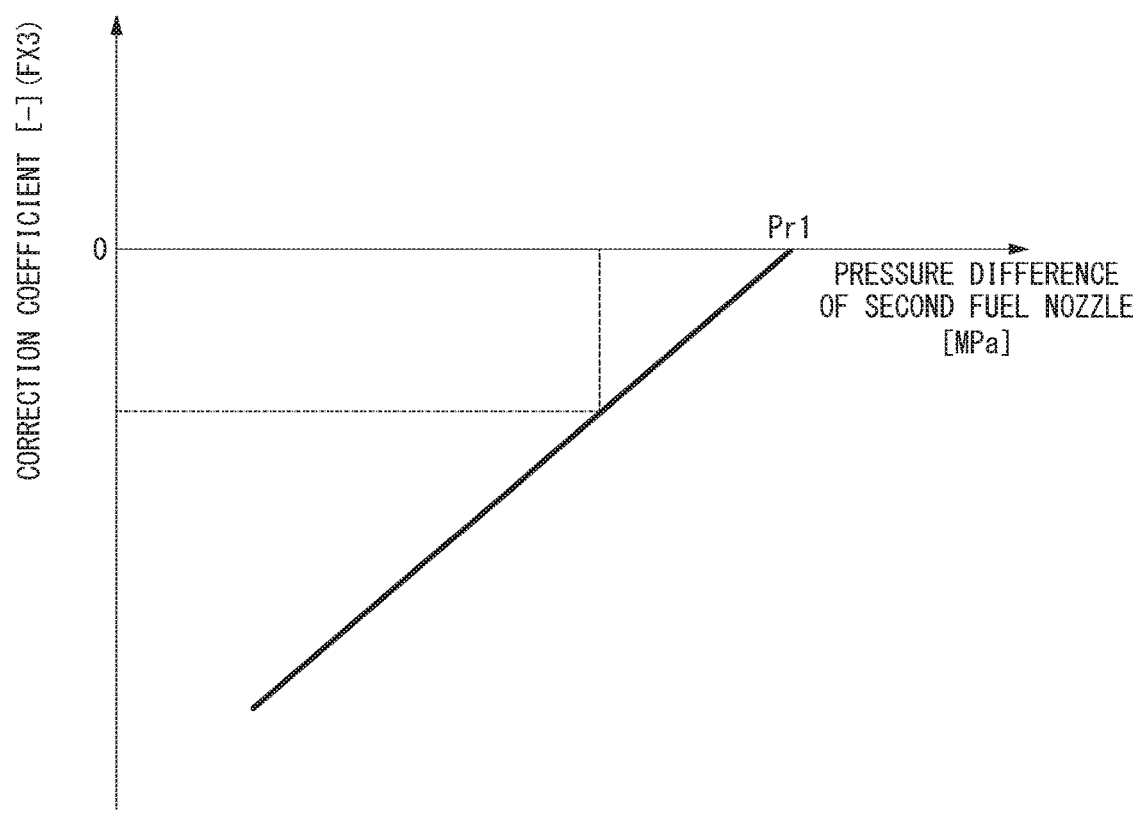
FIG. 4 is a diagram showing a relationship between a pressure difference of a second fuel nozzle and a correction coefficient according to an embodiment of the present invention.
Figure 5:
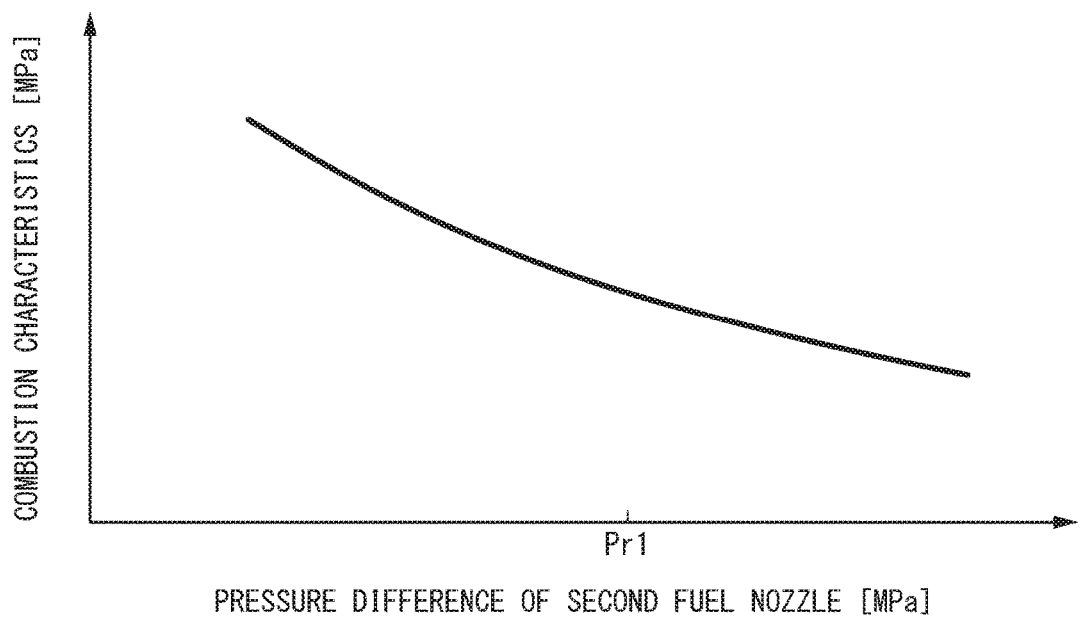
FIG. 5 is a diagram showing a relationship between the pressure difference of the second fuel nozzle and combustion characteristics of the gas turbine according to an embodiment of the present invention.
Figure 6:
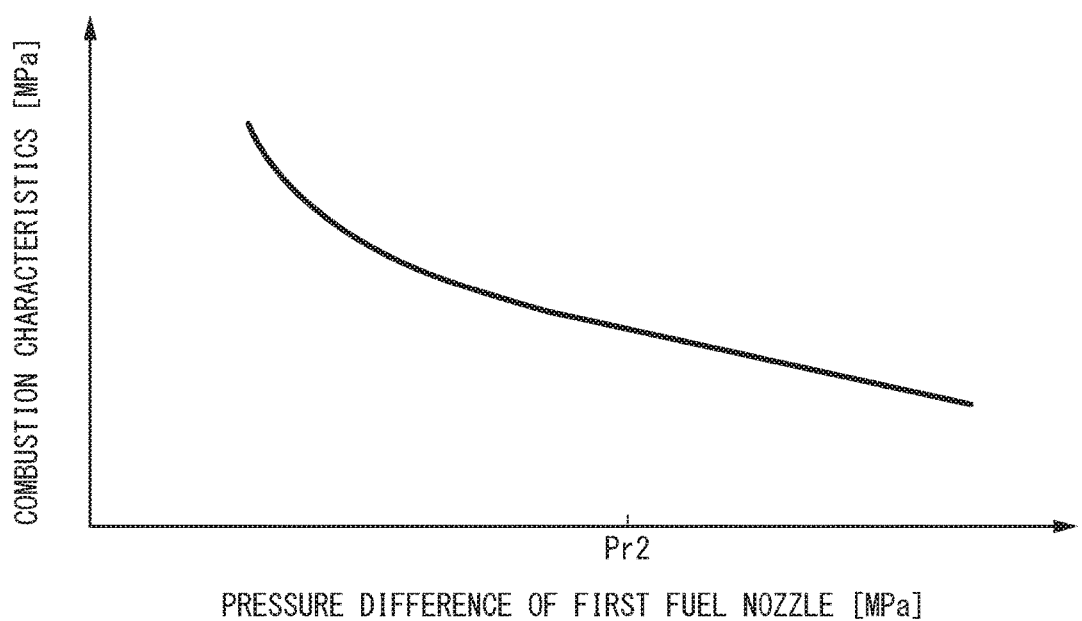
FIG. 6 is a diagram showing each of a relationship between a pressure difference of a first fuel nozzle and fuel characteristics according to an embodiment of the present invention.

The correction value determination unit 103 determines a correction value of the opening degree of each flow rate adjustment valve of the branch line on the basis of a value of a pressure difference (described as a "pressure difference of first fuel nozzle" in FIG. 6 or a "pressure difference of second fuel nozzle" in FIGS. 4 & 5) between a fuel pressure upstream of each of nozzles (a first fuel nozzle 601, a second fuel nozzle 602, and a third fuel nozzle 603 that will be described later) connected to the branch lines respectively and a corrected fuel pressure for the fuel pressure at an outlet.

The first flow rate adjustment valve 20 adjusts a flow rate of the stem fuel supply line Ra on the basis of control by the stem fuel valve opening degree determination unit 101.

The second flow rate adjustment valve 30 adjusts a flow rate to the first branch line R1 from the stem fuel supply line Ra on the basis of a control by the branch line flow rate determination unit 102.

The third flow rate adjustment valve 40 adjusts a flow rate to the second branch line R2 from the stem fuel supply line Ra on the basis of control by the branch line flow rate determination unit 102.

The fourth flow rate adjustment valve 50 adjusts a flow rate to the third branch line R3 from the stem fuel supply line Ra on the basis of the control by the branch line flow rate determination unit 102.

The combustor 60 includes the first fuel nozzle 601, the second fuel nozzle 602, and the third fuel nozzle 603.

The first fuel nozzle 601 is connected to the first branch line R1. The second fuel nozzle 602 is connected to the second branch line R2. The third fuel nozzle 603 is connected to the third branch line R3.

The combustor 60 combusts a fuel gas supplied from each of the first fuel nozzle 601, the second fuel nozzle 602, and the third fuel nozzle 603 to generate a high temperature combustion gas. The combustor 60 exhausts the generated high temperature combustion gas to the turbine body 70.

The turbine body 70 converts thermal energy obtained by expansion of the high temperature combustion gas acquired and input from the combustor 60 into rotational energy of a rotor (a rotation shaft).

The gas turbine 1 according to an embodiment of the present invention determines the opening degree of the flow rate adjustment valve of the stem fuel supply line Ra on the basis of the fuel control signal command value according to an output of the gas turbine 1 and determines the flow rate of the stem fuel supply line Ra. The gas turbine 1 determines the opening degrees of each of the flow rate adjustment valves of the plurality of branch lines branching from the stem fuel supply line Ra on the basis of the operation situation of the gas turbine 1. A distribution of the flow rates supplied to each of the plurality of branch lines from the stem fuel supply line Ra is determined by the determination of the opening degrees. The gas turbine 1 determines the correction value of the opening degrees of each of the flow rate adjustment valves of the branch line on the basis of the value of the pressure difference between the fuel pressure upstream of each of the nozzles connected to the branch lines respectively and the corrected fuel pressure for the fuel pressure at the outlet, and corrects the distribution of the flow rates supplied to each of the plurality of branch lines from the stem fuel supply line Ra.

Therefore, the gas turbine 1 can prevent variation in combustion characteristics of the gas turbine 1 due to variation of the pressure difference between the fuel pressure upstream of each of the nozzles connected to the branch lines respectively and the corrected fuel pressure for the fuel pressure at the outlet by determining the correction value of the opening degrees of each of the flow rate adjustment valves of the branch line on the basis of the value of the pressure difference between the fuel pressure upstream of each of the nozzles connected to the branch lines respectively and the corrected fuel pressure for the fuel pressure at the outlet and correcting the distribution of the flow rates supplied to each of the plurality of branch lines from the stem fuel supply line Ra.

First, an example in which variation in combustion characteristics of the gas turbine 1 due to variation of a pressure difference between a fuel pressure upstream of the second fuel nozzle 602 that contributes most to combustion in the combustor 60 and the corrected fuel pressure for the fuel pressure at an outlet is prevented will be described.

The pressure difference between the fuel pressure upstream of the second fuel nozzle 602 and the corrected fuel pressure for the fuel pressure at the outlet is able to be obtained by the following Formula (1).

$$\text{The pressure difference of the second nozzle } 602 = \text{a manifold pressure} - \text{a pressure of the combustor } 60 \qquad \text{Formula (1):}$$

Note that the manifold pressure of the second fuel nozzle 602 is determined using a pressure gauge.

A casing pressure is detected using the pressure gauge, and the pressure of the combustor 60 (a pressure in an upstream of the turbine body 70) is able to be obtained by calculating (cabin pressure)$\times \alpha$.

Figure 2:
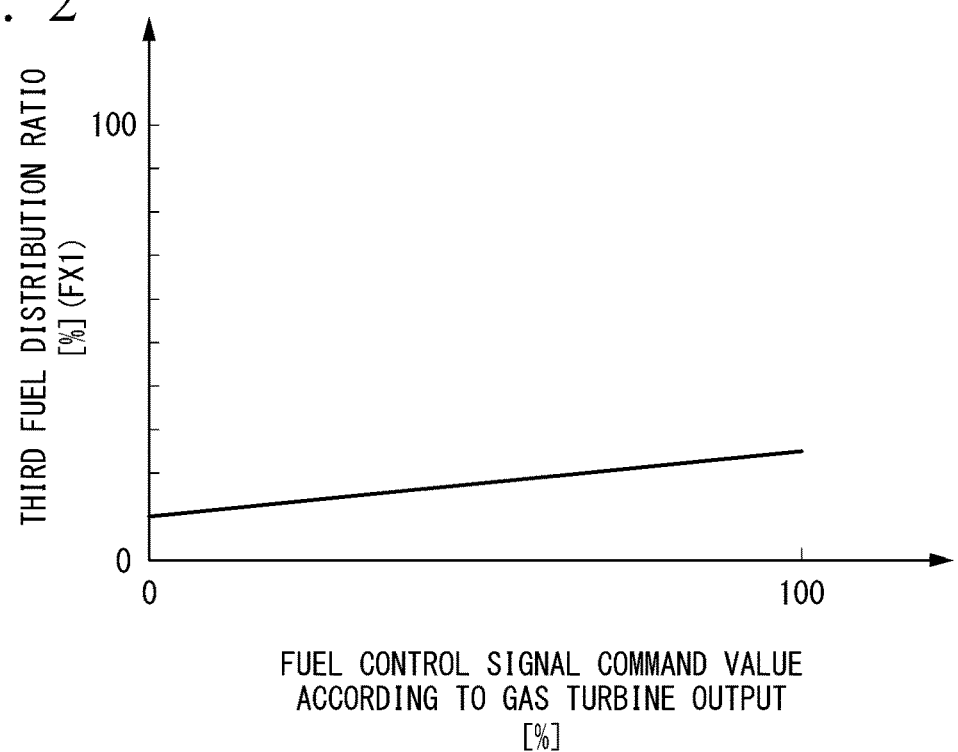
FIG. 2 is a diagram showing a relationship between a fuel control signal command value and a third fuel distribution ratio in an embodiment of the present invention.
Figure 3:
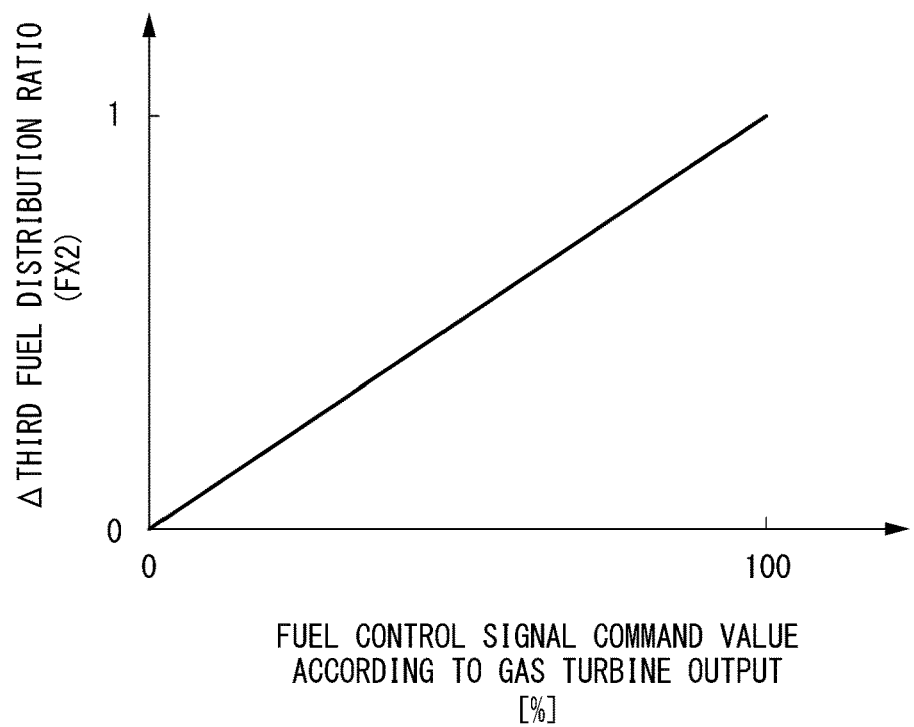
FIG. 3 is a diagram showing a relationship between the fuel control signal command value and a Athird fuel distribution ratio in an embodiment of the present invention.

A relationship between the fuel control signal command value and a $\Delta$ third fuel distribution ratio according to the output of the gas turbine 1 shown in FIG. 3 is able to be obtained by converting the third fuel distribution ratio in a relationship between the fuel control signal command value and a third fuel distribution ratio according to the output of the gas turbine 1 shown in FIG. 2 from 0 to 1.

In an example of a relationship between the pressure difference between the fuel pressure upstream of the second fuel nozzle 602 and the corrected fuel pressure for the fuel pressure at the outlet and a correction coefficient shown in FIG. 4, the correction coefficient is 0 in a case where the pressure difference between the fuel pressure upstream of the second fuel nozzle 602 and the corrected fuel pressure for the fuel pressure at the outlet is greater than Pr1 [MPa] (megapascal). In addition, in an example of the relationship between the pressure difference between the fuel pressure upstream of the second fuel nozzle 602 and the corrected fuel pressure for the fuel pressure at the outlet and the correction coefficient shown in FIG. 4, the correction efficient decreases when the pressure difference between the fuel pressure upstream of the second fuel nozzle 602 and the corrected fuel pressure for the fuel pressure at the outlet decreases from Pr1 [MPa].

The relationship between the pressure difference between the fuel pressure upstream of the second fuel nozzle 602 and the corrected fuel pressure for the fuel pressure at the outlet and the correction coefficient may be determined as follows. That is, a relationship between the second fuel nozzle 602 in the gas turbine 1 and the combustion characteristics of the gas turbine 1 as shown in FIG. 5 is obtained, and in a case where the pressure difference between the fuel pressure upstream of the second fuel nozzle 602 and the corrected fuel pressure for the fuel pressure at the outlet is for example, equal to or less than Pr1 [MPa], the gas turbine 1 determines a correction for reducing the third fuel distribution ratio and performs the correction. The pressure difference between the fuel pressure upstream of the second fuel nozzle 602 and the corrected fuel pressure for the fuel pressure at the outlet increases and it is possible to prevent variation in the combustion characteristics of the gas turbine 1 by performing the correction to reduce the third fuel distribution ratio in a case where the pressure difference between the fuel pressure upstream of the second fuel nozzle 602 and the corrected fuel pressure for the fuel pressure at the outlet is equal to or less than Pr1 [MPa].

Note that the relationship between the pressure difference between the fuel pressure upstream of the second fuel nozzle 602 and the corrected fuel pressure for the fuel pressure at the outlet and the correction coefficient may be determined by performing an experiment on the actual gas turbine 1 and on the basis of experiment results thereof.

In addition, with respect to the example of the relationship between the pressure difference between the fuel pressure upstream of the second fuel nozzle 602 and the corrected fuel pressure for the fuel pressure at the outlet and the combustion characteristics of the gas turbine 1 shown in FIG. 5, it is determined to perform the correction reducing the third fuel distribution ratio in a case where the pressure difference is equal to or less than Pr1 [MPa], but the present invention is not limited thereto. A range of the pressure difference between the fuel pressure upstream of the second fuel nozzle 602 and the corrected fuel pressure for the fuel pressure at the outlet when performing correction for reducing the third fuel distribution ratio is determined is about 0.1 [MPa] to 1 [MPa].

The correction value of the third fuel distribution ratio is able to be obtained by multiplying the third fuel distribution ratio shown in FIG. 3 by the correction coefficient shown in FIG. 4.

That is, a third fuel distribution ratio FTH after the correction is able to be calculated by the following Formula (2), using a third fuel distribution ratio FX1 before the correction shown in FIG. 2, the third fuel distribution ratio shown in FIG. 3, and the correction coefficient shown in FIG. 4.

$$FTH = FX1 + FX2 \times FX3 \qquad \text{Formula (2):}$$

The stem fuel valve opening degree determination unit 101 determines the opening degree of the flow rate adjustment valve (the first flow rate adjustment valve 20) of the stem fuel supply line Ra on the basis of the fuel control signal command value according to the output of the gas turbine 1. The branch line flow rate determination unit 102 determines the opening degrees of each of the flow rate adjustment valves (the second flow rate adjustment valve 30, the third flow rate adjustment valve 40, and the fourth flow rate adjustment valve 50) of the plurality of branch lines (the first branch line R1, the second branch line R2, and the third branch line R3) branching from the stem fuel supply line Ra on the basis of the operation situation of the gas turbine 1. In a case where the variation in the combustion characteristics of the gas turbine 1 due to reduction of the pressure difference between the fuel pressure upstream of the second fuel nozzle 602 and the corrected fuel pressure for the fuel pressure at the outlet is prevented, the correction value determination unit 103 increases the ratio of the third fuel control signal command value and increases the second fuel control signal command value on the basis of the pressure difference value between the fuel pressure upstream of the second fuel nozzle 602 and the corrected fuel pressure for the fuel pressure at the outlet.

Second, an example in which variation in combustion characteristics of the gas turbine 1 due to variation of a pressure difference between a fuel pressure upstream of the first fuel nozzle 601 and the corrected fuel pressure for the fuel pressure at an outlet is prevented in the combustor 60 will be described.

Incidentally, in a case where the variation in the combustion characteristics of the gas turbine 1 due to the variation of the pressure difference between the fuel pressure upstream of the first fuel nozzle 601 of the combustor 60 and the corrected fuel pressure for the fuel pressure at the outlet is prevented, a first fuel control signal command value is controlled on the basis of the pressure difference between the fuel pressure upstream of the first fuel nozzle 601 and the corrected fuel pressure for the fuel pressure at the outlet.

For example, when a relationship between the pressure difference of the first fuel nozzle 601 and fuel characteristics shown in FIG. 6 is established, in a case where the pressure difference between the fuel pressure upstream of the first fuel nozzle 601 and the corrected fuel pressure for the fuel pressure at the outlet is equal to or less than Pr2 [MPa], it is determined to perform correction increasing the first fuel distribution ratio. The pressure difference between the fuel pressure upstream of the first fuel nozzle 601 and the corrected fuel pressure for the fuel pressure at the outlet increases and it is possible to prevent the variation in the combustion characteristics of the gas turbine 1 by performing the correction increasing the first fuel distribution ratio in a case where the pressure difference between the fuel pressure upstream of the first fuel nozzle 601 and the corrected fuel pressure for the fuel pressure at the outlet is equal to or less than Pr2 [MPa].

Note that the relationship between the first fuel distribution ratio and the pressure difference between the fuel pressure upstream of the first fuel nozzle 601 and the corrected fuel pressure for the fuel pressure at the outlet may be determined by performing an experiment on the actual gas turbine 1 and on the basis of an experiment result thereof.

In addition, with respect to the example of the relationship between the first fuel distribution ratio and the pressure difference between the fuel pressure upstream of the first fuel nozzle 601 and the corrected fuel pressure for the fuel pressure at the outlet shown in FIG. 6, it is determined to perform the correction increasing the first fuel distribution ratio in a case where the pressure difference is equal to or less than Pr2 [MPa], but the present invention is not limited thereto. The range of the pressure difference between the fuel pressure upstream of the first fuel nozzle 601 and the corrected fuel pressure for the fuel pressure at the outlet determined to perform the correction increasing the first fuel distribution ratio is about 0.01 [MPa] to 0.1 [MPa].

The stem fuel valve opening degree determination unit 101 determines the opening degree of the flow rate adjustment valve (the first flow rate adjustment valve 20) of the stem fuel supply line Ra on the basis of the fuel control signal command value according to the output of the gas turbine 1. The branch line flow rate determination unit 102 determines the opening degrees of each of the flow rate adjustment valves (the second flow rate adjustment valve 30, the third flow rate adjustment valve 40, and the fourth flow rate adjustment valve 50) of the plurality of the branch branching from the stem fuel supply lines (the first branch line R1, the second branch line R2, and the third branch line R3) on the basis of the operation situation of the gas turbine 1. In a case where the variation in the combustion characteristics of the gas turbine 1 due to the reduction of the pressure difference between the fuel pressure upstream of the first fuel nozzle 601 and the corrected fuel pressure for the fuel pressure at the outlet is prevented, the correction value determination unit 103 increases the ratio of the first fuel control signal command value on the basis of the pressure difference value between the fuel pressure upstream of the first fuel nozzle 601 and the corrected fuel pressure for the fuel pressure at the outlet.

The gas turbine 1 according to an embodiment of the present invention has been described above. In the gas turbine 1, the fuel control device 10 includes the stem fuel valve opening degree determination unit 101, the branch line flow rate determination unit 102, and the correction value determination unit 103. The stem fuel valve opening degree determination unit 101 determines the opening degree of the flow rate adjustment valve (the first flow rate adjustment valve 20) of the stem fuel supply line Ra on the basis of the fuel control signal command value according to the output of the gas turbine 1. The branch line flow rate determination unit 102 determines the opening degrees of each of the flow rate adjustment valves (the second flow rate adjustment valve 30, the third flow rate adjustment valve 40, and the fourth flow rate adjustment valve 50) of the plurality of branch lines (the first branching line R1, the second branching line R2, and the third branching line R3) branching from the stem fuel supply line Ra on the basis of the operation situation of the gas turbine 1. The correction value determination unit 103 determines the correction value of the opening degree of each flow rate adjustment valve of the branch line on the basis of the value of a pressure difference between the fuel pressure upstream of each of nozzles (the first fuel nozzle 601, the second fuel nozzle 602, and the third fuel nozzle 603) connected to the branch lines respectively and the corrected fuel pressure for the fuel pressure at the outlet.

Therefore, the fuel control device 10 can prevent the variation in the combustion characteristics of the gas turbine 1 occurred in a case where the pressure difference between the fuel pressure upstream of each of the nozzles of the combustor 60 and the corrected fuel pressure for the fuel pressure at the outlet varies.

Although the embodiment of the present invention has been described, the fuel control device 10 described above may have a computer system therein. In addition, procedures for processes described above are stored in a computer-readable recording medium in the form of a program and the processes described above are performed by the computer reading and executing the program. Here, as the computer-readable recording medium, there are a magnetic disk, a magneto-optical disc, a CD-ROM, a DVD-ROM, a semiconductor memory, and the like. In addition, the computer program may be distributed to the computer through a communication line and the computer receiving the distribution may execute the program.

In addition, the program described above may realize a part of the functions described above. In addition, the program described above may be a file that is able to realize the functions described above by a combination with a program recorded in the computer system in advance, so called a difference file (a difference program).

Although several embodiments of the present invention have been described, these embodiments are examples and do not limit the scope of the invention. Various additions, omissions, substitutions, and changes may be made to these embodiments without departing from the gist of the invention.

INDUSTRIAL APPLICABILITY

According to the fuel control device according to the embodiment of the present invention, it is possible to prevent variation in combustion characteristics of a gas turbine occurred in a case where a pressure difference between a fuel pressure upstream of each of the nozzles of a combustor and a corrected fuel pressure for the fuel pressure at an outlet varies.

REFERENCE SIGNS LIST

1 Gas turbine
10 Fuel control device
20 First flow rate adjustment valve
30 Second flow rate adjustment valve
40 Third flow rate adjustment valve
50 Fourth flow rate adjustment valve
60 Combustor
70 Turbine body
101 Stem fuel valve opening degree determination unit
102 Branch line flow rate determination unit
103 Correction value determination unit
601 First fuel nozzle
602 Second fuel nozzle
603 Third fuel nozzle

The invention claimed is:

1. A fuel control device configured to correct a distribution of flow rates supplied to each of a plurality of branch lines from a stem fuel supply line when a differential pressure between a fuel pressure at an inlet of a second nozzle and a corrected fuel pressure at an outlet of the second nozzle is changed, the fuel control device comprising:
a processor; and
a non-transitory computer-readable medium having stored thereon executable instructions that, when executed by the processor, cause the fuel control device to function as:
a stem fuel valve opening degree determination unit configured to determine an opening degree of a first flow rate adjustment valve of the stem fuel supply line serving as a basis of the plurality of branch lines based on a fuel control signal command value according to an output of a gas turbine, the fuel control signal command value being used for the first flow rate adjustment valve;
a branch line flow rate determination unit configured to determine, based on an operation situation of the gas turbine, an opening degree of a second flow rate adjustment valve of a first branch line of the plurality of branch lines, an opening degree of a third flow rate adjustment valve of a second branch line of the plurality of branch lines, and an opening degree of a fourth flow rate adjustment valve of a third branch line of the plurality of branch lines; and
a correction value determination unit configured to determine:
a first correction value of the opening degree of the second flow rate adjustment valve based on a value of a first pressure difference between a fuel pressure at an inlet of a first nozzle and a corrected fuel pressure at an outlet of the first nozzle, the fuel pressure being a fuel pressure of the first branch line that is downstream of the second flow rate adjustment valve, and the first nozzle being connected to the first branch line;
a second correction value of the opening degree of the third flow rate adjustment valve based on a value of a second pressure difference between a fuel pressure at the inlet of the second nozzle and a corrected fuel pressure at the outlet of the second nozzle, the fuel pressure being a fuel pressure of the second branch line that is downstream of the third flow rate adjustment valve, and the second nozzle being connected to the second branch line; and
a third correction value to reduce a ratio of total fuel supplied to a third nozzle connected to the third branch line in a case where the second pressure difference is reduced, by calculating a third fuel distribution ratio FTH after the correction, the third fuel distribution ratio FTH being associated with the third nozzle, as FTH=FX1+FX2×FX3 based on: (i) a third fuel distribution ratio FX1 before the correction, the third fuel distribution ratio FX1 being associated with the third nozzle; (ii) a fuel distribution ratio FX2 associated with a third flow rate that is changed with the fuel control signal command value that is used for the first flow rate adjustment valve, the fuel distribution ratio FX2 being obtained by converting the third fuel distribution ratio FX1 from 0 to 1 in a relationship between the third fuel distribution ratio FX1 and fuel control signal command values, the fuel control signal command values being different from the fuel control signal command value that is used for the first flow rate adjustment valve; and (iii) a correction coefficient FX3 associated with the second pressure difference.

2. The fuel control device of claim 1, wherein, the case where the second pressure difference is reduced is where the second pressure difference is in a range of from 0.1 megapascals to 1 megapascal.

3. The fuel control device of claim 1, wherein, in a case where the first pressure difference is reduced, the correction value determination unit is configured to determine the first correction value output by the fuel control device, for increasing a first fuel control signal command value.

4. The fuel control device of claim 3, wherein the case where the first pressure difference is reduced is where the first pressure difference is in a range of from 0.01 megapascals to 0.1 megapascals.

5. A system comprising:
the fuel control device of claim 1;
the gas turbine; and
a combustor including the first nozzle, the second nozzle, and the third nozzle.

6. A combustor comprising:
the fuel control device of claim 1,
wherein each of the first nozzle, the second nozzle, and the third nozzle is configured to be controlled by the fuel control device.

7. A fuel control method performed by a computer wherein a non-transitory computer-readable computer medium having a program stored thereon causes the computer to preform the fuel control method, in which the computer corrects a distribution of flow rates supplied to each of a plurality of branch lines from a stem fuel supply line when a differential pressure between a fuel pressure at an inlet of a second nozzle and a corrected fuel pressure at an outlet of the second nozzle is changed, the fuel control method comprising:

determining an opening degree of a first flow rate adjustment valve of the stem fuel supply line serving as a basis of the plurality of branch lines based on a fuel control signal command value according to an output of a gas turbine, the fuel control signal command value being used for the first flow rate adjustment valve;

determining an opening degree of a second flow rate adjustment valve of a first branch line of the plurality of branch lines based on an operation situation of the gas turbine;

determining an opening degree of a third flow rate adjustment valve of a second branch line of the plurality of branch lines based on the operation situation of the gas turbine;

determining an opening degree of a fourth flow rate adjustment valve of a third branch line of the plurality of branch lines based on the operation situation of the gas turbine;

determining a first correction value of the opening degree of the second flow rate adjustment valve based on a value of a first pressure difference between a fuel pressure at an inlet of a first nozzle and a corrected fuel pressure at an outlet of the first nozzle, the fuel pressure being a fuel pressure of the first branch line that is downstream of the second flow rate adjustment valve, and the first nozzle being connected to the first branch line;

determining a second correction value of the opening degree of the third flow rate adjustment valve based on a value of a second pressure difference between a fuel pressure at the inlet of the second nozzle and a corrected fuel pressure at the outlet of the second nozzle, the fuel pressure being a fuel pressure of the second branch line that is downstream of the third flow rate adjustment valve, and the second nozzle being connected to the second branch line; and determining a third correction value to reduce a ratio of total fuel supplied to a third nozzle connected to the third branch line in a case where the second pressure difference is reduced, by calculating a third fuel distribution ratio FTH after the correction, the third fuel distribution ratio FTH being associated with the third nozzle, as FTH=FX1+FX2×FX3 based on: (i) a third fuel distribution ratio FX1 before the correction, the third fuel distribution ratio FX1 being associated with the third nozzle; (ii) a fuel distribution ratio FX2 associated with a third flow rate that is changed with the fuel control signal command value that is used for the first flow rate adjustment valve, the fuel distribution ratio FX2 being obtained by converting the third fuel distribution ratio FX1 from 0 to 1 in a relationship between the third fuel distribution ratio FX1 and fuel control signal command values, the fuel control signal command values being different from the fuel control signal command value that is used for the first flow rate adjustment valve; and (iii) a correction coefficient FX3 associated with the second pressure difference.

8. A non-transitory computer-readable computer medium having a program stored thereon for causing a computer to perform fuel control processing, in which the computer corrects a distribution of flow rates supplied to each of a plurality of branch lines from a stem fuel supply line when a differential pressure between a fuel pressure at an inlet of a second nozzle and a corrected fuel pressure at an outlet of the second nozzle is changed, the fuel control processing including:

determining an opening degree of a first flow rate adjustment valve of the stem fuel supply line serving as a basis of the plurality of branch lines based on a fuel control signal command value according to an output of a gas turbine, the fuel control signal command value being used for the first flow rate adjustment valve;

determining an opening degree of a second flow rate adjustment valve of a first branch line of the plurality of branch lines based on an operation situation of the gas turbine;

determining an opening degree of a third flow rate adjustment valve of a second branch line of the plurality of branch lines based on the operation situation of the gas turbine;

determining an opening degree of a fourth flow rate adjustment valve of a third branch line of the plurality of branch lines based on the operation situation of the gas turbine;

determining a first correction value of the opening degree of the second flow rate adjustment valve based on a value of a first pressure difference between a fuel pressure at an inlet of a first nozzle and a corrected fuel pressure at an outlet of the first nozzle, the fuel pressure being a fuel pressure of the first branch line that is downstream of the second flow rate adjustment valve, and the first nozzle being connected to the first branch line;

determining a second correction value of the opening degree of the third flow rate adjustment valve based on a value of a second pressure difference between a fuel pressure at the inlet of the second nozzle and a corrected fuel pressure at the outlet of the second nozzle, the fuel pressure being a fuel pressure of the second branch line that is downstream of the third flow rate adjustment valve, and the second nozzle being connected to the second branch line; and determining a third correction value to reduce a ratio of total fuel supplied to a third nozzle connected to the third branch line in a case where the second pressure difference is reduced, by calculating a third fuel distribution ratio FTH after the correction, the third fuel distribution ratio FTH being associated with the third nozzle, as FTH=FX1+FX2×FX3 based on: (i) a third fuel distribution ratio FX1 before the correction, the third fuel distribution ratio FX1 being associated with the third nozzle; (ii) a fuel distribution ratio FX2 associated with a third flow rate that is changed with the fuel control signal command value that is used for the first flow rate adjustment valve, the fuel distribution ratio FX2 being obtained by converting the third fuel distribution ratio FX1 from 0 to 1 in the relationship between the third fuel distribution ratio FX1 and fuel control signal command values, the fuel control signal command values being different from the fuel control signal command value that is used for the first flow rate adjustment valve; and (iii) a correction coefficient FX3 associated with the second pressure difference.

\* \* \* \* \*